E. M. ZOLNIEROWICZ.
AUTOMOBILE LOCK.
APPLICATION FILED DEC. 18, 1917.
1,259,334. Patented Mar. 12, 1918.
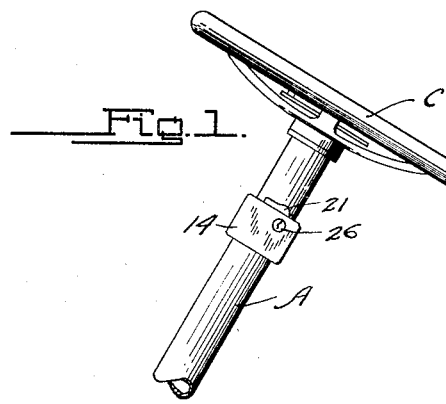
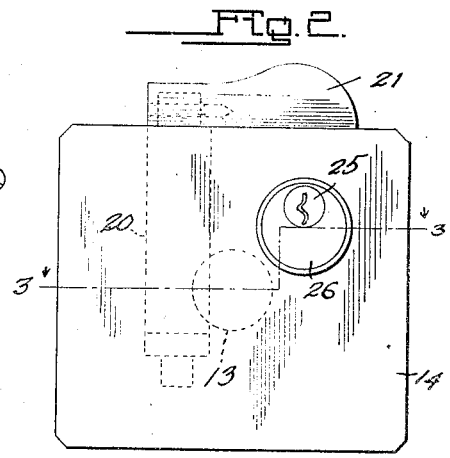
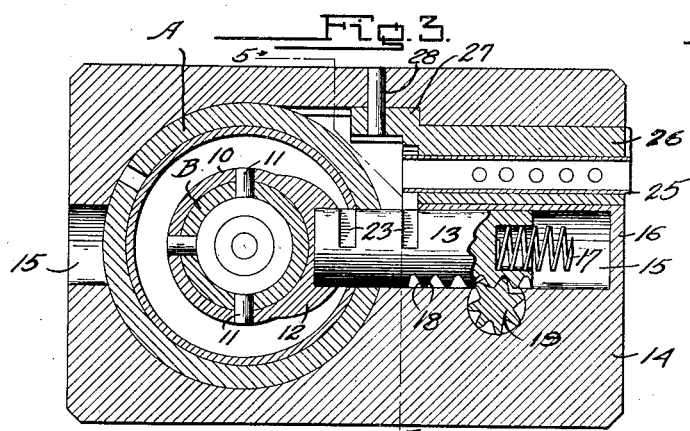
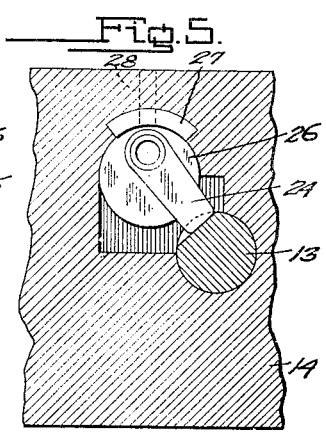
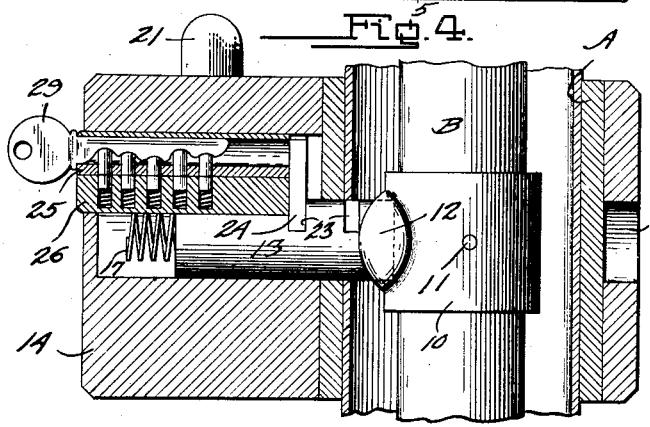
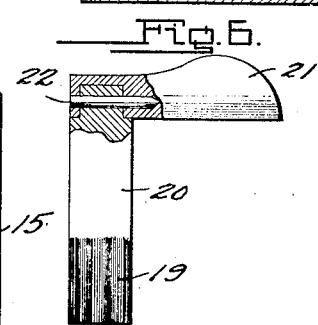
Inventor
Emil M. Zolnierowicz.

UNITED STATES PATENT OFFICE.

EMIL M. ZOLNIEROWICZ, OF CLEVELAND, OHIO.

AUTOMOBILE-LOCK.

1,259,334.                    Specification of Letters Patent.        Patented Mar. 12, 1918.

Application filed December 18, 1917. Serial No. 207,733.

*To all whom it may concern:*

Be it known that I, EMIL M. ZOLNIEROWICZ, a citizen of Poland, residing at Cleveland, in the county of Cuyahoga and State of Ohio, have invented a certain new and useful Improvement in Automobile-Locks, of which the following is a specification.

The present invention relates to locks, particularly of that type adapted for application to the steering columns of automobiles.

The objects of this invention is to provide a lock which is self contained, or which is inclosed within a casing sealed by the steering column itself, and which is placed upon the steering column over one end thereof only; a lock which comprises relatively few parts; a lock which accommodates the ordinary Yale cylinder and plug to gain the advantages of the same; and a lock which cannot be easily tampered with or manipulated without the use of a predetermined key.

The invention comprises various other objects and advantages which will be hereinafter in part described and in part understood from the following detailed description of the present preferred embodiment the same being illustrated in the accompanying drawing wherein:

Figure 1 is a side elevation of the upper end of a steering column having a lock constructed according to this invention applied thereto.

Fig. 2 is an end view of the lock, showing the key slot and the bolt operating handle.

Fig. 3 is a horizontal section taken through the lock substantially in the planes indicated by the line 3—3 in Fig. 2.

Fig. 4 is a vertical section taken through the lock substantially on the planes of the central axis of the steering column.

Fig. 5 is a transverse section taken through the lock on the plane indicated by the line 5—5 in Fig. 3.

Fig. 6 is a detail view partly in section of the bolt operating spindle.

Referring to this drawing A indicates the outer shell or casing of a steering column inclosing a steering post B in the usual manner, the post B having the usual steering wheel C upon its upper end.

The steering post B is provided, in suitably spaced relation from the upper end of the steering column with a collar 10 which is rigidly secured to the steering post by rivets 11 or the like. The collar 10 has an enlargement 12 at one side adapted to project toward the body of the lock when the steering post B is in a predetermined position. The enlargement or boss 12 is apertured for the reception of a sliding bolt 13 which is carried in the lock.

The lock embodies an integral block or casing 14 preferably formed of relatively hard metal having near one end, hereinafter designated as the inner end of the casing, a vertical opening or bore therethrough for the reception of the casing A of the steering column. The body 14 of the lock is adapted to fit upon the steering column with a tight fit and may be placed thereon, and removed therefrom only by sliding the body of the lock longitudinally over and from either end of the steering column.

The body 14 of the lock is provided with a longitudinal central bore or opening 15 which intersects the vertical opening near the inner end of the body, which opens through the inner end of the body for the introduction and removal of the bolt 13 and its adjacent parts, and terminates in spaced relation from the forward end of the body to provide a front wall 16. The bolt 13 is of a length adapted to lie within the forward part of the bore 15 when retracted. The casing A has a radial opening therethrough in registry with the bore 15 and through which the rear end of the bolt 13 may project for engagement in the boss 12. Seated in the forward end of the bolt 13 is a cushioning spring 17 projecting forwardly from the bolt and adapted to bear against the wall 16 to absorb shock incident to the quick retraction of the bolt from the steering column.

The bolt 13 is provided in one side with rack teeth 18 with which meshes a pinion 19 formed upon the end of an operating shaft 20 which is journaled vertically in the body 14. The shaft 20 is in the form of a spindle having a handle 21 upon its upper end which may be detachably secured to the spindle by a pin 22 which is secured transversely through the spindle. The bolt 13 is also provided in one side with transverse longitudinally spaced apart notches or recesses 23 into which is adapted to engage, one at a time, a locking lever 24 which is mounted upon a turning plug 25 seated in a cylinder 26 of a pin lock. The locking lever 24 extends radially from the inner end of the plug 25 and is adapted to move in an edgewise swinging direction into and out of the notches 23. The locking lever 24 holds the plug 25 from forward movement out of the cylinder 26, and the cylinder is held in a suitable longitudinal bore in the body portion 14 by an offset shouldered projection 27 which is seated against the correspondingly shouldered wall of the body portion. A securing pin 28 is engaged through the adjacent side of the body 14 and through the projection 27 to secure the cylinder 26 from turning and from longitudinal displacement from the body. The cylinder 26 and its parts may be removed from the body 14 only by removing the pin 28 and then sliding the cylinder 26 backwardly into the vertical opening in the housing. Of course the cylinder cannot be removed from the housing while the same is mounted upon the steering column as the latter passes through the vertical opening and interrupts the longitudinal passages through the lock casing or block 14.

In operation, a key 29 of the suitable form is inserted in the turning plug 25 of the cylinder 26 to release the turning plug and admit the turning thereof by the key. Such movement of the turning plug swings the locking lever 24 out of the adjacent notch 23 and frees the bolt 13. The hand lever 21 may be now turned in the desired direction to advance the bolt 13 into the recess or keeper slot of the boss 12. When the bolt is thus adjusted the key 29 is turned into its initial position and withdrawn for moving the locking lever 24 into the adjacent slot 23 and locking the plug 25 from turning. The locking lever 24 bears at its outer face against the inner face of the housing 14 and is braced thereby to maintain the bolt 13 in interlocking engagement with the boss 12 even though pressure be applied to the handle 21 for turning the spindle 20. The steering post B is thus locked securely against movement by unauthorized persons. The bolt 13 cannot be withdrawn from the casing 14 until the latter is slipped up over the steering column to admit the longitudinal movement of the bolt through the inner end of the housing. The sides, top and bottom, and outer end of the housing are formed integral and as a part of the block and consequently cannot be separated or pried opened, and the integral front wall 16 prevents access to the bolt 13.

When the bolt 13 is released by the locking lever 24 and the handle 21 is turned to retract the bolt, the spring 17 first engages the wall 16 and cushions the retracting movement of the bolt.

It is of course understood that various changes and modifications may be made in the details of construction and design of the above specifically described embodiment of this invention without departing from the spirit thereof, such changes and modifications being restricted only by the scope of the following claims.

What is claimed is:

1. In an automobile lock, the combination with a steering column having a post therein, of a collar secured to the post within the column and having a radial keeper opening therein and the column having a radial opening in the side thereof adapted to register at times with the opening in the collar, a block having a vertical opening through its inner end adapted to receive said steering column and surround the same and provided with an axial bore intersecting said vertical opening and closed at its other end, a sliding bolt fitting in the forward end of the axial opening and retained therein by the steering column when secured through the block, means in the block for reciprocating the bolt for movement into and from the keeper opening, and means for locking the bolt when adjusted.

2. In an automobile lock, the combination with a steering column having a post therein adapted to be turned, of a lock housing provided with an opening therethrough for the reception of the steering column and provided with bores therein opening into the steering column opening, a sliding bolt mounted in one of said bores, means for reciprocating the sliding bolt into and out of engagement with the steering post and a lock for the bolt introduced into a second bore through said steering column opening and having a key slot opening through the outer wall of the housing for operating the lock exteriorly of the housing.

3. In an automobile lock, the combination with a steering column and a post therein adapted to be turned, of a closed housing having a vertical opening therethrough adapted to receive the steering column and provided with a bore opening at its inner end into said opening of the steering column and closed at its outer end, a sliding bolt in said bore adapted to move toward and from the steering post and retained in the bore thereby, a spindle journaled in the housing and connected to the bolt for reciprocating the same, a cylinder lock seated in the housing and having a lateral enlargement at its inner end to hold the lock from withdrawal outwardly from the housing and adapted to be introduced and moved into and from the housing through said steering column opening, and a handle on the outer end of the spindle.

4. In an automobile lock, the combination with a steering column having a post therein adapted to be turned, of a block housing provided with an opening therethrough admitting the sliding of the housing over the end of the steering column and provided with an axial opening communicating with the steering column opening and terminating in spaced relation to the outer end of the housing, a sliding bolt arranged in the axial opening and confined therein by the steering column, said bolt having rack teeth in one side and having notches therein, a spindle journaled in the housing and having an operating handle on its outer end and a pinion on its inner end adapted to engage the teeth of the bolt for sliding the same upon the turning of the spindle to advance the bolt into interlocking engagement with said post, a cylinder lock introduced into the housing through said steering column opening and provided with a turning plug, and a locking lever mounted on the plug adapted to be turned into and out of engagement with the notches of the sliding bolt.

5. In an automobile lock, the combination with a steering column and a post mounted to turn therein, of an integral block having an opening therethrough at one end to receive the steering column and provided with an axial opening extending from said end to a point near the other end of the block and intersecting said opening, said block also having a lock receiving opening in said other end leading to said first opening, a sliding bolt in the axial opening adapted to be confined therein between the steering column when in place and the closed end of the axial opening, a spring carried upon the outer end of the sliding bolt adapted to engage the closed end of the axial opening to cushion the bolt when retracted, manual means for retracting the bolt operable exteriorly of the block, and a lock seated in said lock opening and having a movable part for interlocking engagement with the sliding bolt to hold the same when extended into interlocking engagement with said post.

EMIL M. ZOLNIEROWICZ.